United States Patent
Fraij et al.

(10) Patent No.: US 8,191,464 B2
(45) Date of Patent: Jun. 5, 2012

(54) DETECTOR FOR ELECTRIC COOKING APPLIANCE DETECTING PRESENCE OF A BOWL AND ITS TEMPERATURE

(75) Inventors: Fred Fraij, Drachten (NL); Klaas Kooijker, Drachten (NL); Herman Huizinga, Drachten (NL); Mindert Kats, Marum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 377 days.

(21) Appl. No.: 11/996,313

(22) PCT Filed: Jul. 11, 2006

(86) PCT No.: PCT/IB2006/052338
§ 371 (c)(1),
(2), (4) Date: Jan. 21, 2008

(87) PCT Pub. No.: WO2007/010438
PCT Pub. Date: Jan. 25, 2007

(65) Prior Publication Data
US 2008/0216668 A1  Sep. 11, 2008

(30) Foreign Application Priority Data
Jul. 20, 2005  (EP) .................................. 05106642

(51) Int. Cl.
*A47J 37/12* (2006.01)
(52) U.S. Cl. ......................................... 99/331
(58) Field of Classification Search .................... 99/337, 99/330, 336, 403–410, 353–355; 126/391, 126/369; 219/492, 494, 489, 497, 441, 435–439
See application file for complete search history.

(56) References Cited

U.S. PATENT DOCUMENTS

| | | | | |
|---|---|---|---|---|
| 5,183,998 A | * | 2/1993 | Hoffman et al. | 219/492 |
| 5,809,870 A | * | 9/1998 | Baillieul | 99/330 |
| 5,927,181 A | * | 7/1999 | Desnoyers et al. | 99/330 |
| 6,121,585 A | * | 9/2000 | Dam | 219/438 |
| 6,155,159 A | * | 12/2000 | Bizard | 99/330 |
| 6,172,339 B1 | | 1/2001 | Thevenin | |
| 2003/0000939 A1 | * | 1/2003 | Faries et al. | 219/497 |

FOREIGN PATENT DOCUMENTS

| | | |
|---|---|---|
| EP | 0815786 | 1/1998 |
| EP | 1169959 | 1/2002 |
| GB | 2306878 A * | 8/1995 |
| GB | 2 306 878 A * | 5/1997 |
| GB | 2306878 | 5/1997 |
| GB | 2386825 | 10/2003 |
| JP | 05084132 A * | 4/1993 |
| WO | 0062700 | 10/2000 |

* cited by examiner

*Primary Examiner* — Tu B Hoang
*Assistant Examiner* — Thien S Tran

(57) ABSTRACT

An electric cooking appliance includes heater for heating a bowl and a sensor for sensing the temperature of the bowl. The sensor includes a movable thermal contact member to contact the wall of the bowl. The cooking appliance is provided with a detector for detecting the presence of the bowl, whereby displacement of the movable thermal contact member operates the detection.

20 Claims, 1 Drawing Sheet

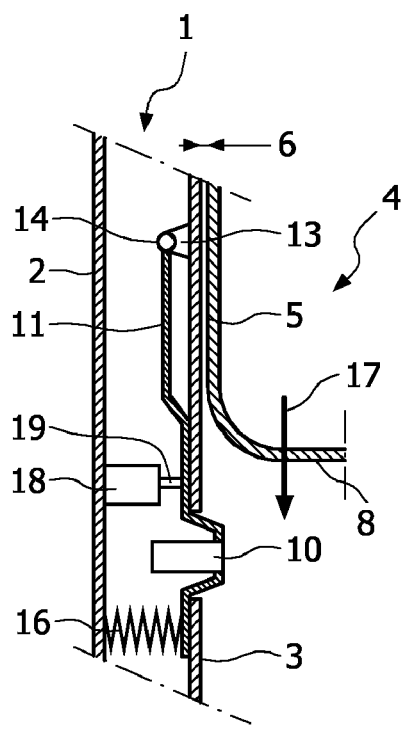
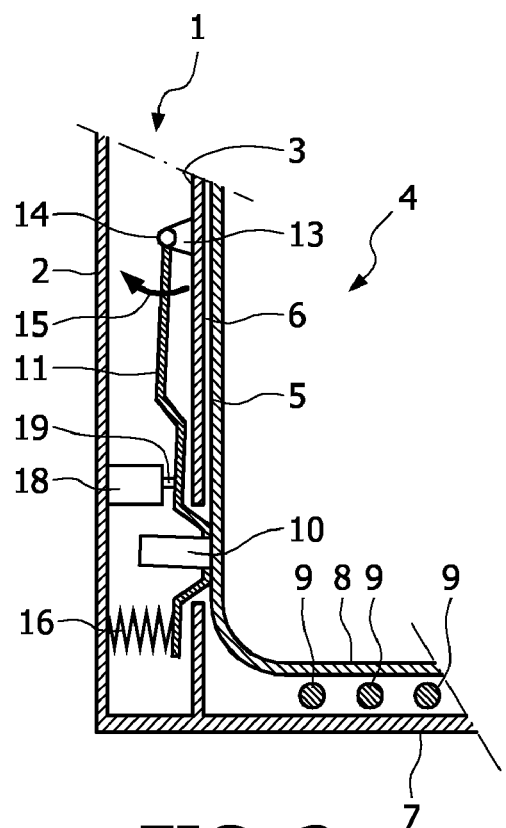
FIG. 1
FIG. 2
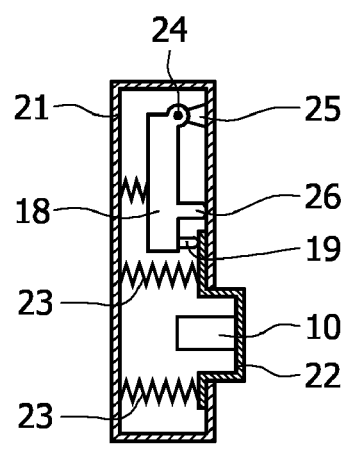
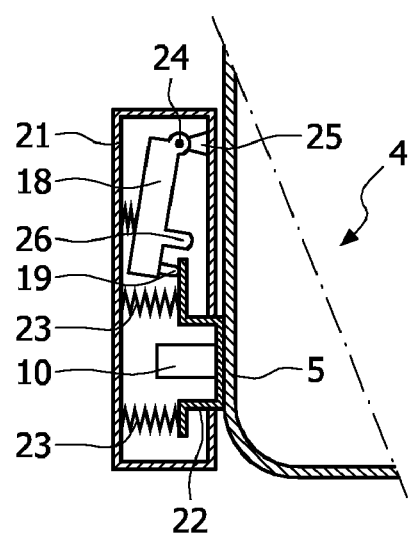
FIG. 3
FIG. 4

DETECTOR FOR ELECTRIC COOKING APPLIANCE DETECTING PRESENCE OF A BOWL AND ITS TEMPERATURE

The invention is related to an electric cooking appliance comprising heating means for heating a bowl and sensor means for sensing the temperature of the bowl, which sensor means comprise a movable thermal contact member to contact the wall of the bowl, which wall can be the lateral side wall of the bowl as well as the bottom or bottom wall of the bowl. The heating means can be a heat radiating member such as a tubular electric resistance, or a halogen heating member, or an induction heating member. The expression cooking appliance includes any device for heating a substance, whereby the substance not necessarily has to "cook" in the strict meaning of that word.

The invention can be applied to any cooking appliance, for example a cooking appliance whereby a bowl can be placed on top of a heating member. The invention is in particular related to a cooking appliance comprising a casing that can enclose a removable bowl, such as a deep fat fryer or the like, whereby the bowl can be removed from the casing, for example, in order to clean the bowl.

The electric power supply to the heating means of the cooking appliance can be switched off in case the sensed temperature rises above a predetermined value, and can be switched on again when the sensed temperature drops below that value. Thereby, the temperature of the bowl is maintained near a predetermined temperature, which temperature can be selected by the user of the cooking appliance.

An electric cooking appliance of this kind is disclosed in GB-A-2306878. This publication describes a deep fryer comprising a casing, which casing comprises heating means for heating a bowl and heat-responsive control means, and which casing can enclose a removable bowl (oil container). The heat-responsive control means include a thermal contact member located at a side of the casing and which is engaged by the bowl when the bowl is present in the casing. When the bowl is inserted into the casing, or removed from the casing, the contact member will be moved whereby it is resiliently urged against the wall of the bowl. Thereby, it remains in contact with the bowl as long as the bowl is located in the casing in order to provide a thermal path between the bowl and the heat-responsive control means. The heat-responsive means comprise either a thermostat or a thermal fuse, and it can also be a combination of both. The thermostat keeps the temperature of the bowl near a certain predetermined value by switching on and switching off the electric power supply to the heating means, and the fuse can interrupt the supply of electric power to the heating means when the temperature of the bowl exceeds a certain value, which value is, in general, substantially higher than said predetermined value.

The electric cooking appliance can furthermore be provided with a detector for detecting the presence of the bowl. Such safety device may block the supply of electric power to the heating means in case the removable bowl is not present, in order to avoid overheating of the cooking appliance. Such detection means are for example disclosed in EP-A-1169959. This publication describes an electric cooking appliance, in particular a deep fat fryer, whereby the casing of the fryer is provided with a detector comprising a movable member that is pushed away by the wall of the bowl when the bowl is inserted into the casing.

The presence of such safety device in a cooking appliance requires an additional part having a relative complicated structure. In particular in case of a mechanical detector, as described in EP-A-1169959, movable parts are present, which parts can stick or be clamped, so that a reliable operation of the detector is not always ensured.

An object of the invention is an electric cooking appliance, whereby the cooking appliance is provided with a movable thermal contact member to contact the wall of a bowl in order to sense the temperature of the bowl, whereby the presence or absence of the bowl is detected without the presence of a separate detector for detecting said presence or absence.

To accomplish with the object, the cooking appliance is provided with detection means for detecting the presence of the bowl, whereby displacement of said movable thermal contact member operates said detection means. Thereby, a detector that is provided with a separate contact member for contacting the wall of the bowl in order to sense the presence of the bowl is redundant. Only one contact member that contacts the wall of the bowl is present, for sensing the temperature of the bowl as well as for detecting the presence of the bowl.

In a preferred embodiment, the cooking appliance comprises a casing and a removable bowl, whereby the casing can enclose the removable bowl, and whereby the casing is provided with the heating means and with the sensor means. Thereby, preferably, the cooking appliance is a deep fat fryer. In such cooking appliance the temperature is relatively high, and also because of the presence of heated fat, it is important that reliable safety devices are present.

In a preferred embodiment, a part of the sensor means that moves together with the movable thermal contact member abuts a switch member, so that the switch is operated by movement of the thermal contact member. The switch can interrupt the electrical power supply to the heating means in its position whereby it is not activated by movement of the thermal contact member, i.e. whereby the thermal contact member does not rest against the wall of the bowl. Therefore, the heating means cannot be switched on when the bowl is not present in the casing. When the thermal contact member is moved by the wall of the bowl, said switch is activated, whereby said interruption of the electric power supply is terminated.

Preferably, the switch and the thermal contact member are present in a serial relationship in one of the electric current supply wires of the heating member. Thereby, electric current can only be supplied to the heating member when the thermal contact member as well as the switch is in the "on" position. The thermal contact member may contain a bimetal strip for moving an on/off switch for the electric current.

In a preferred embodiment, the thermal contact member can move in a direction substantially perpendicular to the plane of the wall of the bowl at the location of the contact. When the thermal contact member contacts the bowl at its lateral wall, the wall will slide along the thermal contact member when the bowl is inserted into the casing in downward direction. Such sliding movement can be an advantage, because it may clean the front side (contact area) of the thermal contact member. When the thermal contact member contacts the bowl at the lower side, there will be no sliding movement between the thermal contact member and the wall (bottom) of the bowl.

Preferably, the thermal contact member is urged against the wall of the bowl by means of a spring member. Such structure ensures the movement of the thermal contact member to its correct position when the bowl is removed from the casing.

As said before, preferably control means are present for disconnecting the electric power supply to the heating means when the detection means do not detect the presence of the bowl.

The invention is also related to a detector for an electric cooking appliance comprising heating means for heating a bowl, which detector includes sensor means for sensing the temperature of a bowl, which sensor means comprise a movable thermal contact member to contact the wall of the bowl, whereby the detector is provided with detection means for detecting the presence of the bowl, whereby displacement of said movable thermal contact member operates said detection means.

The invention is furthermore related to a method for detecting the presence of a removable bowl at an electric cooking appliance comprising heating means for heating the bowl and sensor means for sensing the temperature of the bowl, whereby the sensor means sense the temperature by urging a movable thermal contact member against the wall of the bowl, whereby the cooking appliance is provided with detection means for detecting the presence of the bowl, whereby displacement of said movable thermal contact member operates said detection means.

The invention will now be further elucidated by means of a description of two embodiments. The first embodiment is a deep fat fryer comprising a casing and a removable bowl, whereby the casing is provided with a sensor for sensing the temperature of the bowl as well as a detector for detecting the presence of the bowl in the casing. The second embodiment is a detector that can be mounted in any electric cooking appliance. Reference is made to the drawing comprising Figures which are only schematic representations, in which:

FIG. 1 is a part of a sectional view of the deep fryer whereby the removable bowl is moving into the casing; and FIG. 2 is a part of a sectional view of the deep fryer whereby the removable bowl is in its operational position in the casing;

FIG. 3 shows a detector that can be used in a cooking appliance; and

FIG. 4 shows the detector, whereby the presence of a bowl is detected.

The Figures are only diagrammatically views and do not represent parts of the deep fat fryer which are not relevant for understanding the invention.

FIG. 1 is a part of a sectional view of the side wall 1 (vertical wall) of the casing of the deep fat fryer, comprising an outer plate 2 and an inner plate 3. Outer plate 2 forms the outside of the deep fryer and inner plate 3 is the wall of the space of the deep fryer in which the removable bowl 4 can be present. In top view, said space can be circular, square or rectangular, or can have any other appropriate shape, which shape corresponds with the shape of the bowl 4, so that the side wall 5 (vertical wall) of the bowl 4 has a short distance 6 from the inner plate 3 of the casing.

FIG. 2 shows a larger part of a sectional view of the deep fryer, whereby also a portion of the lower wall 7 (bottom) of the casing is represented. Thereby, the removable bowl 4 is in its operational position, so that its lower wall 8 (bottom wall) is located near the tubular heating member 9, which heating member 9 is fixed near the lower wall 7 in the casing of the deep fryer. The bowl 4 can be heated by heat radiation from the tubular heating member 9, when the heating member 9 is switched on, i.e. when electric power is supplied to the heating member 9.

In order to keep the temperature of the bowl 4 near a predetermined value, the electric power supply to the heating member 9 can be switched on and can be switched off by means of a electric current switch (not shown), which switch is controlled by a micro controller, which micro controller receives a signal from a temperature sensor in a thermal contact member 10. The thermal contact member 10 can rest against the wall 5 of the removable bowl 4, as is shown in FIG. 2, whereby the temperature of the bowl 4 is sensed by the thermal contact member 10 and compared by the micro controller with the predetermined value, which value is set by the user of the deep fat fryer. Dependent on the difference between the sensed temperature of the wall 5 of the bowl 4 and said predetermined value, the electric power supply to the heating member 9 is switched on or switched off.

The thermal contact member 10 is mounted on a hinging frame 11, which frame 11 is fixed to the inner plate 3 of the casing through a support element 13. Thereby, the hinging frame 11 can hinge around axis 14, perpendicular with respect to plane of the drawing, as is indicated with arrow 15 in FIG. 2. In order to ensure a reliable heat conducting contact between the wall 5 of the bowl 4 and the thermal contact member 10, the contact member 10 is urged against the wall 5 by means of a pushing spring 16. Pushing spring 16 urges hinging frame 11 against the inner plate 3 of wall 1 of the casing when the bowl 4 is not present in the casing, as is shown in FIG. 1.

For safety reasons it is desired that the heating member 9 can not be supplied with electric power as long as the removable bowl 4 is not present in the casing of the deep fryer. Therefore, an additional switch disconnects the heating member from the electric power source, or the same switch that controls the temperature of the bowl 4 as described above is permanently switched off, in case the bowl 4 is not in its operational position in the casing of the deep fryer. The presence of the bowl 4 in the casing can be detected by means of a separate mechanical detector, for example a pin that is pushed away by the bowl 4 when the bowl 4 is inserted in the casing. However, according to the invention, the displacement of the thermal contact member 10 operates the detection means for detecting the presence of the bowl 4.

When the bowl 4 is inserted in the casing of the deep fat fryer, which movement of the bowl 4 is indicated with arrow 17 in FIG. 1, the wall 5 of the bowl 4 will displace the thermal contact member 10, resulting in a hinging movement of frame 11. That hinging movement is detected by a detector switch 18, which detector switch 18 is fixed to the outer plate 2 of the wall 1 of the casing. The detector switch 18 is provided with a movable pin 19, which pin 19 rests against the hinging frame 11 and is pushed outwardly by spring means in the detector switch 18. When frame 11 moves to the left (in the Figures) the pin 19 will be pushed in, whereby the detector switch 18 detects the presence of the bowl 4. Then a signal will be sent to the switch, or other means, in order to unblock the supply of electric power to the heating member 9.

In this manner, there is only one member that mechanically contacts the bowl 4, in order to control the temperature of the bowl 4 as well as to block the electric power supply to the heating member 9 in case of absence of the bowl 4 in the casing of the deep fryer.

FIGS. 3 and 4 show a detector for sensing the temperature of a heated bowl 4 and for detecting the presence of the bowl 4, which detector can be used in cooking appliances of any kind. The detector comprises a housing 21 including a movable part 22, which movable part 22 reaches outside the housing 21 through a hole in the housing 21. A thermal contact member 10 is attached to the movable part 22, and movable part 22 is pushed to the right (in the Figures) by means of springs 23. When a bowl 4 is located near the detector, the movable part 22 will rest against the wall 5 of the bowl 4, as is shown in FIG. 4. Thereby, the thermal contact member will sense the temperature of the bowl 4.

The detector furthermore comprises a detector switch 18, which detector switch 18 is hinging around axis 24 and attached to the housing 21 by means of support element 25. Push spring 23 urges detector switch 18 to the right (in the Figures), so that stop 26 will rest against the wall of the housing 21 when the movable part 22 is in the position as shown in FIG. 3. Detector switch 18 is provided with a pin 19, which pin 19 can be pushed into detector switch 18 in order to operate the switch. Only a small movement of pin 19 to the left (in the Figures) is required to put the detector switch 18 in its "on" position. Such movement will take place when the movable part 22 is displaced to the left (in the Figures) by the wall 5 of the bowl 4 that is located near the detector, as is shown in FIG. 4. In case the displacement of the movable part 22 is more than the possible displacement of the pin 19 in detector switch 18, then the detector switch 18 will hinge a little, as is shown in FIG. 4.

The thermal contact member 10 comprises a bimetal strip, which strip can activate a switch when the sensed temperature passes a predetermined temperature. When the predetermined temperature is passed while the temperature is increasing, the switch will be put in the "off" position, and when the predetermined temperature is passed while the sensed temperature is decreasing, then the switch will be put in its "on" position. The switch in the thermal contact member 10 is connected in series with the detector switch 18 by an electric wire, and both switches are present in one of the electric supply wires of the heating means of the cooking appliance. The wires are not shown in the Figures. In case both switches are in the "on" position, the heating means can be supplied with electric power, and when one of the switches is in the "off" position, then the electric power supply to the heating means are blocked.

The embodiment of the deep fat fryer and the embodiment of the detector, as described above, are only examples of devices according to the invention; many other embodiments are possible.

The invention claimed is:

1. An electric cooking appliance comprising:
   a heater for heating a bowl when connected to an electric power supply;
   a sensor for sensing a temperature of the bowl, wherein the sensor comprises a hinging frame and a movable thermal contact member movable in a substantially perpendicular direction which is substantially perpendicular to a wall of the bowl to contact the wall of the bowl; and
   a detector for detecting a presence of the bowl, wherein displacement of said movable thermal contact member operates said detector to disconnect the electric power supply from the heater in case of absence of the bowl and to connect the electric power supply to the heater in case of detection of the presence of the bowl, wherein said detector does not contact the bowl when the bowl is inserted in the electric cooking appliance, wherein the movable thermal contact member and the detector are urged in the substantially perpendicular direction, wherein the movable thermal contact member is on the hinging frame, the hinging frame extending away from a first side of the movable thermal contact member past the detector and contacting the detector, and wherein an end of the hinging frame away from the first side of the movable thermal contact member is pivotally mounted on a casing that receives the bowl.

2. The electric cooking appliance as claimed in claim 1, further comprising a casing, wherein the bowl is a removable bowl, wherein the casing encloses the removable bowl, and wherein the casing is provided with the heater and with the sensor.

3. The electric cooking appliance as claimed in claim 2, wherein the cooking appliance is a deep fat fryer.

4. The electric cooking appliance as claimed in claim 1, wherein a part of the sensor that moves together with the movable thermal contact member abuts a switch member, so that a switch is operated by movement of the movable thermal contact member.

5. The electric cooking appliance as claimed in claim 1, wherein the movable thermal contact member and the detector are urged in the substantially perpendicular direction by at least two springs that are parallel to each other.

6. The electric cooking appliance as claimed in claim 1, wherein the movable thermal contact member is urged against the wall of the bowl by a spring member.

7. The electric cooking appliance as claimed in claim 1, further comprising controller for disconnecting the electric power supply to the heater when the detector does not detect the presence of the bowl.

8. A detector for an electric cooking appliance comprising:
   a heater for heating a bowl when connected to an electric power supply;
   a sensor for sensing a temperature of a bowl, wherein the sensor comprises a hinging frame and a movable thermal contact member movable in a substantially perpendicular direction which is substantially perpendicular to a wall of the bowl to contact the wall of the bowl; and
   detection device configured to detect a presence of the bowl, wherein displacement of said movable thermal contact member operates said detection device to disconnect the electric power supply from the heater in case of absence of the bowl and to connect the electric power supply to the heater in case of detection of the presence of the bowl, and wherein said detection device does not contact the bowl when the bowl is inserted in the electric cooking appliance, wherein the movable thermal contact member and the detection device are urged in the substantially perpendicular direction, wherein the movable thermal contact member is on the hinging frame, the hinging frame extending away from a first side of the movable thermal contact member past the detection device and contacting the detection device, and wherein an end of the hinging frame away from the first side of the movable thermal contact member is pivotably mounted on a casing that receives the bowl.

9. A method for detecting a presence of a removable bowl at an electric cooking appliance comprising the acts of:
   heating the removable bowl by connecting a heater to an electric power supply;
   sensing a temperature of the removable bowl by urging a movable thermal contact member against a wall of the removable bowl in a substantially perpendicular direction which is substantially perpendicular to the wall of the bowl; and
   detecting a presence of the removable bowl by a detector, wherein displacement of said movable thermal contact member operates said detector to disconnect the electric power supply from the heating means in case of absence of the removable bowl and to connect the electric power supply to the heating means in case of detection of the presence of the removable bowl, and wherein said detector does not contact the removable bowl when the removable bowl is inserted in the electric cooking appliance, wherein the movable thermal contact member and the detector are urged in the substantially perpendicular direction, wherein the movable thermal contact member is on a hinging frame, the hinging frame extending away from a first side of the movable thermal contact member past the detector and contacting the detector, and wherein an end of the hinging frame away from the first side of the movable thermal contact member is pivotably mounted on a casing that receives the bowl.

10. The electric cooking appliance of claim 1, wherein the movable thermal contact member is pivotably mounted on the casing that receives the bowl.

11. The detector of claim 8, wherein the movable thermal contact member is pivotably mounted on the casing that receives the bowl.

12. The method of claim 9, wherein the detector is pivotably mounted on the casing that receives the removable bowl.

13. The detector of claim 8, wherein the movable thermal contact member and the detector are urged in the substantially perpendicular direction by at least two springs that are parallel to each other.

14. The method of claim 9, wherein the movable thermal contact member and the detector are urged in the substantially perpendicular direction by at least two springs that are parallel to each other.

15. The electric cooking appliance of claim 1, wherein the movable thermal contact member is pivotably mounted on a side wall of the casing, and the heater is located at a bottom wall of the casing.

16. The detector of claim 8, wherein the movable thermal contact member is pivotably mounted on a side wall of the casing, and the heater is located at a bottom wall of the casing.

17. The method of claim 9, wherein the movable thermal contact member is pivotably mounted on a side wall of the casing, and the heater is located at a bottom wall of the casing.

18. The electric cooking appliance of claim 1, further comprising a spring between an outer plate of the electric cooking appliance and a further end of the hinging frame, wherein the further end of the hinging frame is at a second side of the sensor opposite the first side.

19. The detector of claim 8, further comprising a spring between an outer plate of the electric cooking appliance and a further end of the hinging frame, wherein the further end of the hinging frame is at a second side of the sensor opposite the first side.

20. The method of claim 9, further comprising the act of providing a spring between an outer plate of the electric cooking appliance and a further end of the hinging frame, wherein the further end of the hinging frame is at a second side of the sensor opposite the first side.

* * * * *